(12) United States Patent
Inha et al.

(10) Patent No.: US 10,644,516 B2
(45) Date of Patent: May 5, 2020

(54) CHARGING MULTIPLE USER APPARATUSES

(71) Applicant: Microsoft Technology Licensing, LLC, Redmond, WA (US)

(72) Inventors: Kai Inha, Järvenpää (FI); Marko Yliaho, Tampere (FI); Juha Backman, Espoo (FI)

(73) Assignee: Microsoft Technology Licensing, LLC, Redmond, WA (US)

(*) Notice: Subject to any disclaimer, the term of this patent is extended or adjusted under 35 U.S.C. 154(b) by 27 days.

(21) Appl. No.: 15/159,783

(22) Filed: May 19, 2016

(65) Prior Publication Data

US 2017/0338673 A1 Nov. 23, 2017

(51) Int. Cl.
*H02J 7/00* (2006.01)
*G06F 1/26* (2006.01)

(52) U.S. Cl.
CPC .............. *H02J 7/0021* (2013.01); *G06F 1/26* (2013.01); *H02J 7/0026* (2013.01); *H02J 7/0052* (2013.01); *H02J 7/0054* (2013.01); *H02J 2007/0001* (2013.01); *H02J 2007/0062* (2013.01); *H02J 2007/0096* (2013.01)

(58) Field of Classification Search
CPC ...... H02J 7/0021; H02J 7/0026; H02J 7/0052; H02J 2007/0001; H02J 2007/0062
USPC ............................................. 320/137; 32/137
See application file for complete search history.

(56) References Cited

U.S. PATENT DOCUMENTS

| | | | |
|---|---|---|---|
| 8,085,034 B2 | 12/2011 | Sirton | |
| 8,742,620 B1 | 6/2014 | Brennan et al. | |
| 9,112,363 B2 | 8/2015 | Partovi | |
| 9,130,397 B2 | 9/2015 | Leabman et al. | |
| 9,184,622 B2 | 11/2015 | Geris et al. | |
| 2005/0225292 A1* | 10/2005 | Damlamian | H02J 7/0003 320/128 |
| 2007/0103110 A1* | 5/2007 | Sagoo | H02J 7/025 320/109 |
| 2008/0315826 A1 | 12/2008 | Alberth, Jr. et al. | |
| 2010/0063645 A1 | 3/2010 | Brown | |

(Continued)

FOREIGN PATENT DOCUMENTS

| | | | |
|---|---|---|---|
| CN | 103715736 A | | 4/2014 |
| GB | 2522708 | * | 8/2015 |
| GB | 2522708 A | | 8/2015 |

OTHER PUBLICATIONS

"International Search Report and Written Opinion Issued in PCT Application No. PCT/US2017/031472", dated Jul. 20, 2017, 13 Pages.

(Continued)

*Primary Examiner* — Nathaniel R Pelton (57) ABSTRACT

According to an aspect, there is provided a method connectivity of at least two user apparatuses is identified to a power source via a Universal Serial Bus type-C connection (USB-C). Apparatus characteristics of the at least two user apparatuses are obtained. Charging preference data relating to the at least two user apparatuses is also obtained. Based on the apparatus characteristics and the charging preference data, a charging scheme is determined to provide charging power to the at least two user apparatuses from the power source. The determined charging scheme is then applied to charge the at least two user apparatuses via the USB-C connection.

20 Claims, 6 Drawing Sheets

(56) References Cited

U.S. PATENT DOCUMENTS

| | | | |
|---|---|---|---|
| 2010/0063756 A1* | 3/2010 | Agrawal | G01R 31/3693 |
| | | | 702/63 |
| 2011/0016333 A1 | 1/2011 | Scott et al. | |
| 2011/0213510 A1 | 9/2011 | Mozayeny | |
| 2012/0253567 A1 | 10/2012 | Levy et al. | |
| 2013/0046415 A1 | 2/2013 | Curtis | |
| 2014/0132210 A1* | 5/2014 | Partovi | H02J 7/025 |
| | | | 320/108 |
| 2014/0184165 A1* | 7/2014 | Takahashi | H01M 10/48 |
| | | | 320/134 |
| 2014/0292279 A1* | 10/2014 | Rehbock | H02J 7/0075 |
| | | | 320/134 |
| 2015/0270733 A1* | 9/2015 | Inha | H02J 7/0054 |
| | | | 320/103 |
| 2016/0126779 A1* | 5/2016 | Park | H02J 50/80 |
| | | | 320/108 |

OTHER PUBLICATIONS

"Olympia SB5500 Portable Solar Panel Battery Charger with USB and MicroUSB, 5500mAh", Retrieved on: Dec. 29, 2015, 7 pages Available at: http://www.amazon.com/Olympia-SB5500-Portable-Battery-MicroUSB/dp/B00TT9WNI0.

Browne, et al., "SPOR Solar Battery Chargers USB Cables & Accessories", Published on: Jun. 16, 2014, 17 pages Available at: http://www.iamabacker.com/2014/06/spor-solar-battery-chargers-usb-cables.html.

"Solar Power for All usb Gadgets", Published on: Feb. 23, 2015, 3 pages Available at: http://www.instructables.com/id/Solar-Energy-For-All-usb-Gadgets/.

Jingwei, et al., "Scheduling of electric vehicle charging request and power allocation at charging stations with renewable energy", In Proceedings of 33rd Chinese Control Conference, Jul. 28, 2014, pp. 7066-7071.

* cited by examiner

CHARGING MULTIPLE USER APPARATUSES

BACKGROUND

Electronic devices, for example, smart phones and tablet computers, need to be charged usually at daily basis in order to keep them operative. Especially earlier electronic devices included a device manufacturer specific charger and a charger port. Recently, a technology standard called Universal Serial Bus type-C (USB type-C and/or USB-C) was agreed between various device manufacturers and software providers. Traditionally it has been possible to convey operating or charging power only in one direction via a USB cable. The strength of the USB-C is that it is able to convey both operating or charging power and data in both directions. This also means that practically any electronic device connected to another electronic device using the USB-C may act as a charging entity. As an example, if a monitor is connected to a computer using the USB-C, only the monitor needs to be connected to the electric power network, and the monitor provides operating power to the computer via the USB-C.

SUMMARY

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one embodiment, a method is provided. The method comprises identifying, by at least one processor, connectivity of at least two user apparatuses to a power source via a Universal Serial Bus type-C connection (USB-C), obtaining, by the at least one processor, apparatus characteristics of the at least two user apparatuses, obtaining, by the at least one processor, charging preference data relating to the at least two user apparatuses, determining, by the at least one processor, a charging scheme based on the apparatus characteristics and the charging preference data to provide charging power to the at least two user apparatuses from the power source, and applying, by the at least one processor, the determined charging scheme to charge the at least two user apparatuses via the USB-C connection.

According to another embodiment, an apparatus is provided. The apparatus comprises at least one processing unit and at least one memory. The at least one memory stores program instructions that, when executed by the at least one processing unit, cause the apparatus to identify connectivity of at least two user apparatuses to a power source via a USB-C connection, obtain apparatus characteristics of the at least two user apparatuses, obtain charging preference data relating to the at least two user apparatuses, wherein the charging preference data comprises natural language input from a user, determine a charging scheme based on the apparatus characteristics and the charging preference data to provide charging power to the at least two user apparatuses from the power source, and apply the determined charging scheme to charge the at least two user apparatuses via the USB-C connection.

According to another embodiment, a user apparatus is provided. The user apparatus comprises at least one processing unit and at least one memory. The at least one memory stores program instructions that, when executed by the at least one processing unit, cause the apparatus to identify connectivity of at least two user apparatuses to a power source via a USB-C connection, obtain apparatus characteristics of the at least two user apparatuses, obtain charging preference data relating to the at least two user apparatuses, wherein the charging preference data comprises user-related data from at least one user application, determine a charging scheme based on the apparatus characteristics and the charging preference data to provide charging power to the at least two user apparatuses from the power source, and apply the determined charging scheme to charge the at least two user apparatuses via the USB-C connection.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples. Furthermore, as used in this application and in the claims, the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items.

When multiple devices and a charger are connected to each other via the USB-C, it may be difficult to determine how to distribute charging power between the multiple devices. Various embodiments are illustrated for determining a charging scheme for user apparatuses. At least two user apparatuses are connected to a power source via a Universal Serial Bus type-C (USB-C) connection. In at least some embodiments apparatus characteristics of the at least two user apparatuses and charging preference data relating to the at least two user apparatuses are obtained by an intelligent application executed, for example, by at least one of the user apparatuses. The intelligent application may determine a charging scheme based on the apparatus characteristics and the charging preference data to provide charging power to the at least two user apparatuses from the power source, and apply the determined charging scheme to charge the user apparatuses via the USB-C connection. In at least some embodiments, the intelligent application may also receive natural language input from a user or obtain user-related data from at least one user application, and the charging scheme may be determined based on this.

At least some of the illustrated embodiments provide a solution where by using an intelligent application the interconnected apparatuses are able to share the energy provided by the power source via the USB-C connection with the most effective way. Further, in at least some embodiments, the charging scheme may be determined by the intelligent application without any manually set apparatus priorities.

Figure 1:
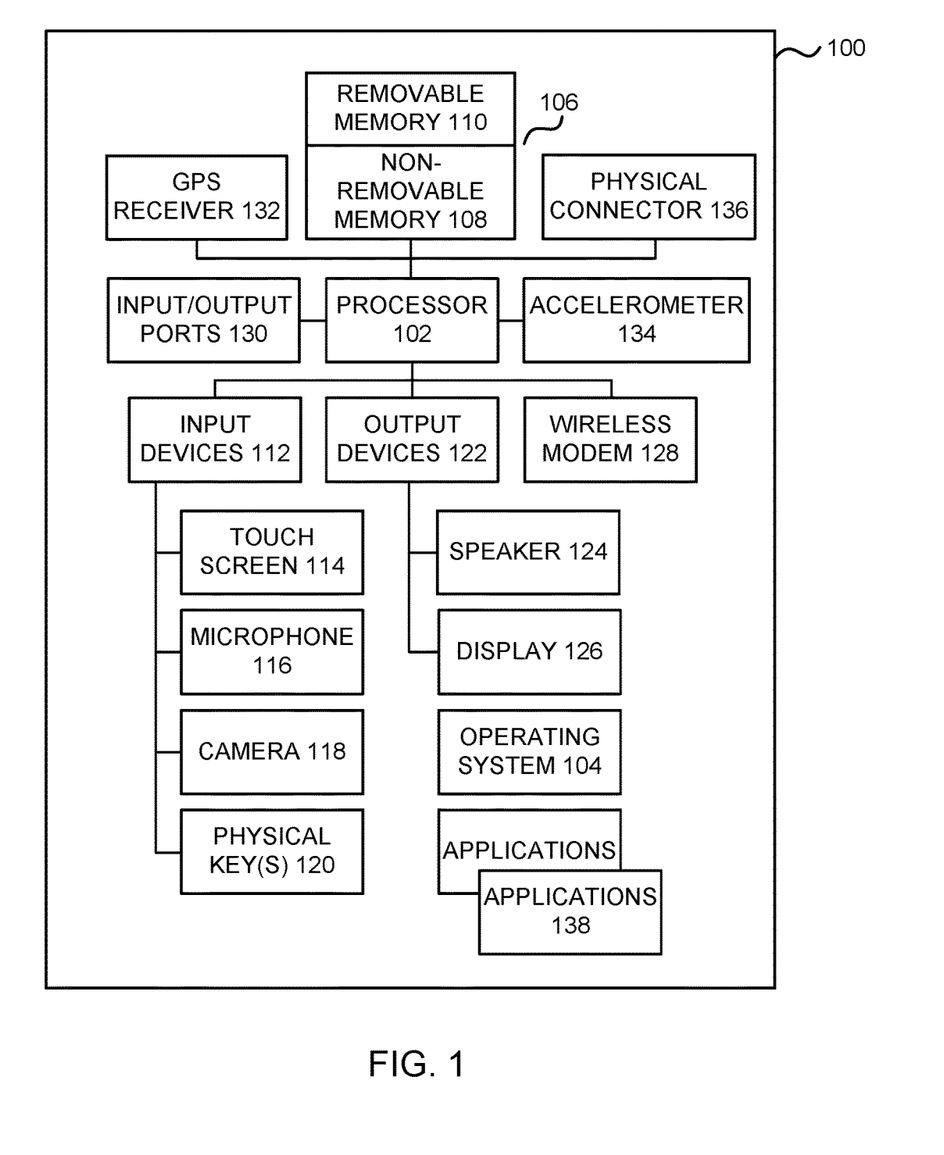
FIG. 1 is a system diagram depicting an apparatus including a variety of optional hardware and software components.

FIG. 1 is a system diagram depicting an apparatus 100 including a variety of optional hardware and software components. Any components in the apparatus 100 can communicate with any other component, although not all connections are shown, for ease of illustration. The apparatus 100 can be any of a variety of computing devices (for example, a cell phone, a smartphone, a handheld computer, a tablet computer, a Personal Digital Assistant (PDA), a network server etc.).

The illustrated apparatus 100 can include a controller or processor 102 (e.g., signal processor, microprocessor, ASIC, or other control and processing logic circuitry) for performing such tasks as signal coding, data processing, input/output processing, power control, and/or other functions. An operating system 104 can control the allocation and usage of the components and support for one or more application programs 138. The application programs can include common mobile computing applications (e.g., email applications, calendars, contact managers, web browsers, messaging applications), or any other computing application.

The illustrated apparatus 100 can include a memory 106. The memory 106 can include non-removable memory 108 and/or removable memory 110. The non-removable memory 108 can include RAM, ROM, flash memory, a hard disk, or other well-known memory storage technologies. The removable memory 110 can include flash memory or a Subscriber Identity Module (SIM) card, which is well known in mobile communication systems, or other well-known memory storage technologies, such as "smart cards". The memory 106 can be used for storing data and/or code for running the operating system 104 and the applications 138. If the apparatus 100 is a mobile phone or smart phone, the memory 106 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The apparatus 100 can support one or more input devices 112, such as a touchscreen 114, microphone 116, camera 118 and/or physical keys or a keyboard 120 and one or more output devices 122, such as a speaker 124 and a display 126. Some devices can serve more than one input/output function. For example, the touchscreen 114 and the display 126 can be combined in a single input/output device. The input devices 112 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 104 or applications 138 can comprise speech-recognition software as part of a voice user interface that allows a user to operate the apparatus 100 via voice commands. Further, the apparatus 100 can comprise input devices and software that allows for user interaction via a user's spatial gestures, such as detecting and interpreting gestures to provide input to a gaming application.

A wireless modem 128 can be coupled to an antenna (not shown) and can support two-way communications between the processor 102 and external devices, as is well understood in the art. The modem 128 is shown generically and can include a cellular modem for communicating with the mobile communication network and/or other radio-based modems (e.g., Bluetooth or Wi-Fi). The wireless modem 128 is typically configured for communication with one or more cellular networks, such as a GSM network for data and voice communications within a single cellular network, a WCDMA (Wideband Code Division Multiple Access) network, an LTE (Long Term Evolution) network, a 4G LTE network, between cellular networks, or between the mobile apparatus and a public switched telephone network (PSTN) etc.

The apparatus 100 can further include at least one input/output port 130, a satellite navigation system receiver 132, such as a Global Positioning System (GPS) receiver, an accelerometer 134, and/or a physical connector 136, which can be a USB port, a USB-C port, IEEE 1394 (FireWire) port, and/or RS-232 port. The illustrated components are not required or all-inclusive, as any components can deleted and other components can be added.

Any combination of the illustrated components disclosed in FIG. 1, for example, at least one of the processor 102, the memory 106 and the physical connector 136 may constitute means for identifying connectivity of a first user apparatus and at least one other user apparatus to a power source via a USB-C connection, means for obtaining apparatus characteristics of the first user apparatus and the at least one other user apparatus, means for obtaining charging preference data relating to the user apparatus and the at least one other user apparatus, means for determining a charging scheme based on the apparatus characteristics and the charging preference data to provide charging power to the user apparatus and the at least one other user apparatus from the power source, and means for applying the determined charging scheme to charge the user apparatus and the at least one other user apparatus via the USB-C connection.

Figure 2A:
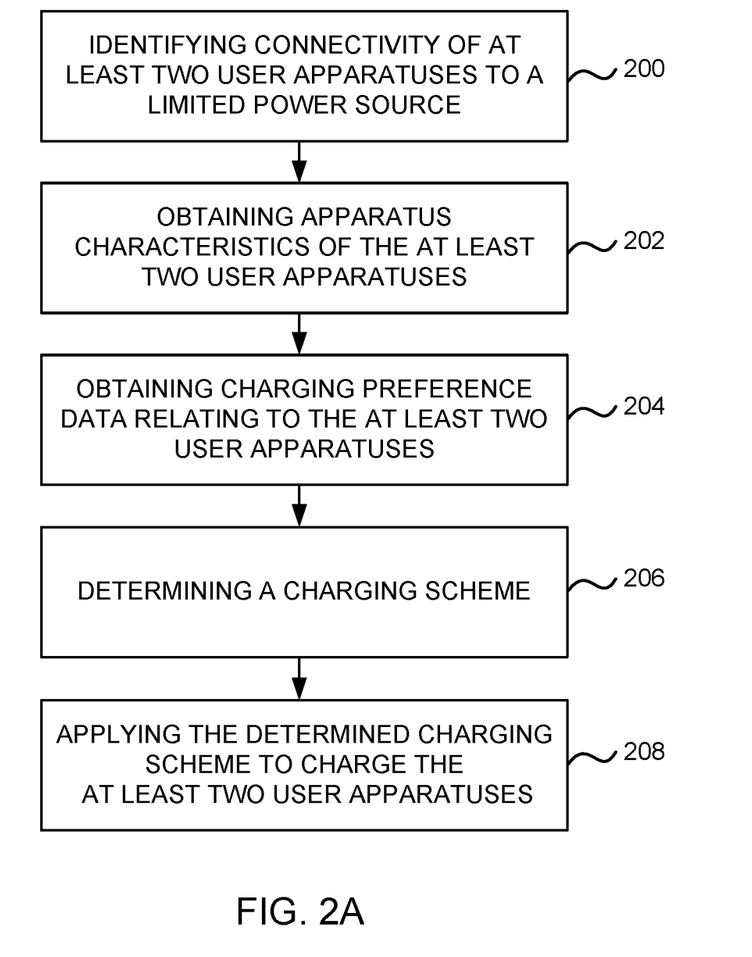
FIG. 2A is a flow diagram illustrating a method for determining a charging scheme according to one embodiment.

FIG. 2A is a block diagram illustrating a method for determining a charging scheme according to one embodiment. Multiple apparatuses have been connected to a power source. The power source may be a limited power source and term "limited power source" may mean that the power source is not able to charge all the connected apparatuses simultaneously at their maximum charging parameters. The term "limited power source" may, alternatively or in addition, also mean that the availability of the power source is limited temporally. For example, the power source may be available only for a certain period of time. The term "limited power source" may, alternatively or in addition, also mean that the power source is a time-wise limited unpredictable power source. For example, the power source may be a solar cell, a thermo generator, a bicycle generator, a wind generator or a wearable item that can provide electrical energy.

Figure 3A:
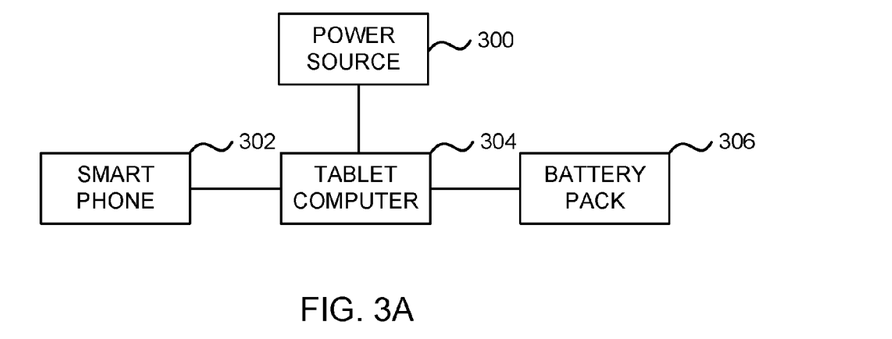
FIG. 3A is a block diagram illustrating connectivity between a charger and user apparatuses to be charged according to one embodiment.

Referring now to FIG. 3A, it illustrates an example of possible apparatuses connected to a power source. In FIG. 3A, a smart phone 302, a tablet computer 304 and a battery pack 306 have been connected to a power source 300 via USB-C connections. FIG. 3A illustrates only one possible physical connection arrangement between the apparatuses. Logically, the USB-C is always point-to-point connected, and the actual physical connection set-up may vary. The USB-C has multiple methods and channels for identification, for passing power, commands and data. For example, USB 3 and USB 2 data channels can be used for USB data communication in the same physical connector. Further, the USB-C has the so called Power Delivery (PD) mechanism for identification, power distribution negotiation and for power-related communication between connected devices. The expression "via the USB-C connection" used in the description is used to address one, all or any combination of the mentioned or non-listed USB-C data and power carrying mechanisms. In FIG. 3A, the power source 300 is able to charge each of the apparatuses even if only the tablet computer 304 is directly connected to the power source 300.

Figure 3B:
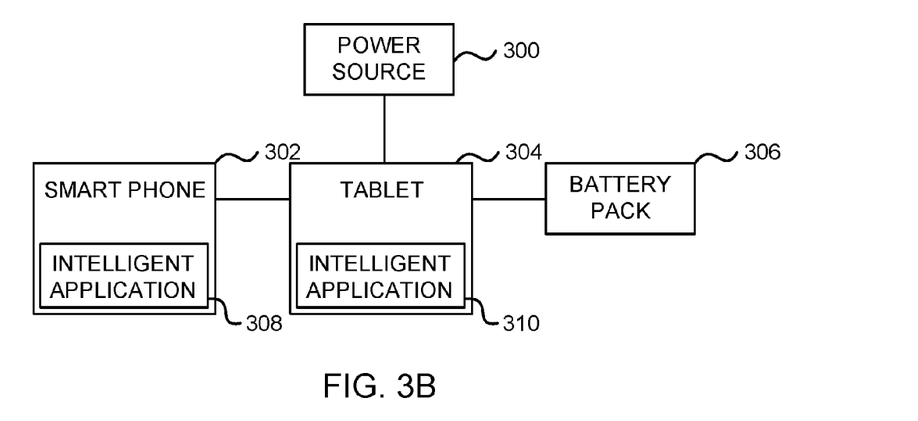
FIG. 3B is a block diagram illustrating connectivity between a charger and user apparatuses to be charged according to another embodiment.
Figure 3C:
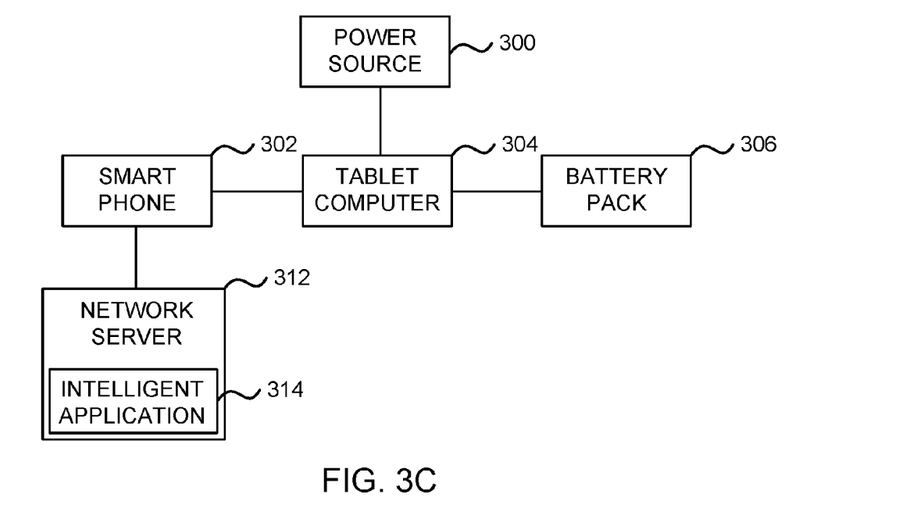
FIG. 3C is a block diagram illustrating connectivity between a charger and user apparatuses to be charged according to another embodiment.

Referring now back to FIG. 2A, at 200 connectivity of at least two user apparatuses (for example, the smart phone 302, the tablet computer 304 and the battery pack 306 of FIG. 3A) is identified to a power source via a USB-C connection. This may mean that the apparatuses know about the other apparatuses having a connection to the same power source. As indicated in FIG. 3B, in one embodiment, at least one of the user apparatuses 302, 304, 306 may execute an intelligent application that is used to implement a charging scheme between the apparatuses. As indicated in FIG. 3C, in another embodiment, the intelligent application 314 may be executed by a network server 312 (for example, by a cloud service) and a user apparatus, for example the smart phone 302, may have a data connection to the network server 312 via a data communication network, for example, a wireless area network or a mobile communications network.

As indicated in FIG. 3A, one of the user apparatuses may be a battery pack 306. Therefore, since the purpose of the battery pack 306 is to act as a power source resource, it may not execute an application similarly as the other apparatuses.

At 202 apparatus characteristics of the at least two user apparatus are obtained, for example, by the intelligent application. The apparatus characteristics may comprise at least one an apparatus type, apparatus owner information, apparatus manufacturer, maximum charging voltage/current, and charging status of the user apparatus. The apparatus characteristics of the at least two user apparatus may be obtained from each of the user apparatuses via the USB-C connection or via a wireless connection established between the user apparatuses. Further, an intelligent application executed by a user apparatus may provide this information to other intelligent application executed by other user apparatuses. The apparatus characteristics may be stored by the user apparatuses or intelligent application in any readable form, for example, text, extensible markup language (XML) format etc.

Using the elements of FIG. 3B, an intelligent application 308 executed by the smart phone 300 may know that the tablet computer 304 and the battery pack 306 are connected to the power source 300. The intelligent application 308 executed by the smart phone 302 also may know the battery status of the tablet computer 304 and the battery pack 306.

At 204 charging preference data relating to the at least two user apparatuses is obtained. The charging preference data may be user set data. For example, the user may have earlier set charging preferences in the intelligent application executed by the user apparatus. In one embodiment, the user may not have to separately set charging priorities in each of the apparatuses. It may be enough that the setting is made in an intelligent application of one user apparatus. The charging preference data may also comprise natural language input from a user, and the natural language input may indicate how a user wishes to charge the apparatuses. The charging preference data may also indicate a ratio of dual-charging, percentages etc. When charging preference data is obtained, the intelligent applications executed by the apparatuses may exchange information stored by the applications. The information may be exchanged between the apparatuses via the USB-C connection or a wireless connection, for example, Bluetooth or any other wireless connection available to the apparatuses.

At 206 a charging scheme is determined based on the apparatus characteristics and the charging preference data to provide charging power to the at least two user apparatuses from the power source 300. As on example, when determining the charging scheme, the intelligent application may notice that a smart phone and a tablet computer of the same user are connected to the power source. The intelligent application also has the information available that the maximum charging voltage/current for the smart phone is 5V/1 A. At the same time, the intelligent application has access to the information, based on the charging preference data (for example, based on priority information, information in a calendar application or some other user-related application or natural language input from the user), that the smart phone should be charged first and only then the tablet computer. The determined charging scheme thus determines how the apparatus are to be charged. The intelligent applicant may store the charging scheme only for the duration of implementing the charging scheme. In addition or alternatively, the charging scheme may be stored by the intelligent application also for a later use and selection by the user. After the determination, if more than one user apparatus comprises the intelligent application, each intelligent application knows how the charging scheme is to be executed.

At 208 the determined charging scheme is applied to charge the at least two user apparatuses via the USB-C connection. As the connections between the power source 300 and the user apparatuses 302, 304, 306 are point-to-point connections, each of the user apparatuses may negotiate the correct charging parameters (for example, voltage/current to be used) with the power source 300 in accordance with the determined charging scheme. If only a single intelligent application is used, this application may take care of the implementation of the charging scheme for each of the user apparatuses. The USB-C has the so called Power Delivery (PD) mechanism for identification, power distribution negotiation and for power-related communication between connected devices, and the intelligent application makes use of the PD mechanism when applying the determined charging scheme to charge the user apparatuses via the USB-C connection.

Using the intelligent application or applications, the interconnected apparatuses are able to share the energy provided by the limited power source via the USB-C connection with the most effective way.

Figure 2B:
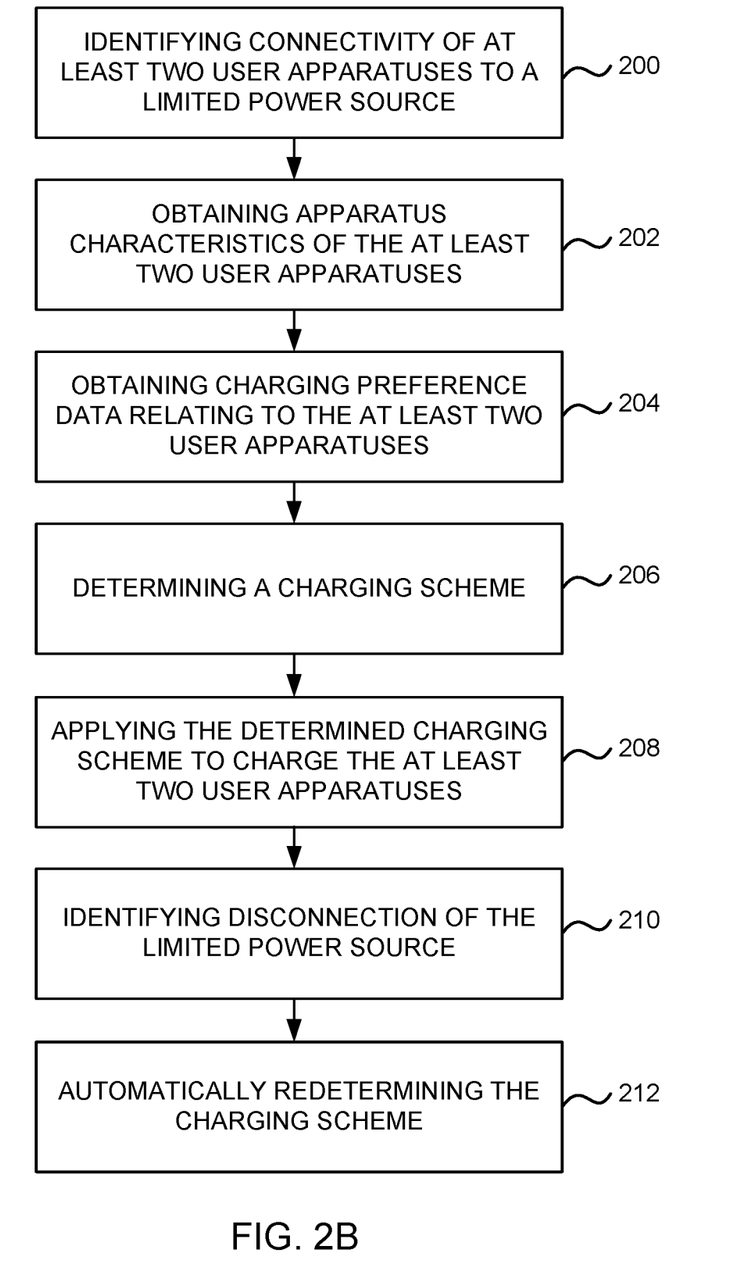
FIG. 2B is a flow diagram illustrating a method for determining a charging scheme according to another embodiment.

FIG. 2B is a block diagram illustrating a method for determining a charging scheme according to one embodiment. The difference between the embodiments of FIG. 2B and FIG. 2A is that after applying the determined charging scheme at 208 at 210 the intelligent application identifies disconnection of the limited power source. Similarly, other intelligent applications possibly executed in other connected apparatuses may also notice the disconnection of the limited power source. In response to the identification, at 212 the charging scheme is automatically redetermined. As an example, when the power source 300 has been disconnected and when it is also determined that the battery pack 306 is fully charged, the battery pack 306 may then be used to charge the smart phone 302 and/or the tablet computer 304 depending on the redetermined charging scheme.

Figure 2C:
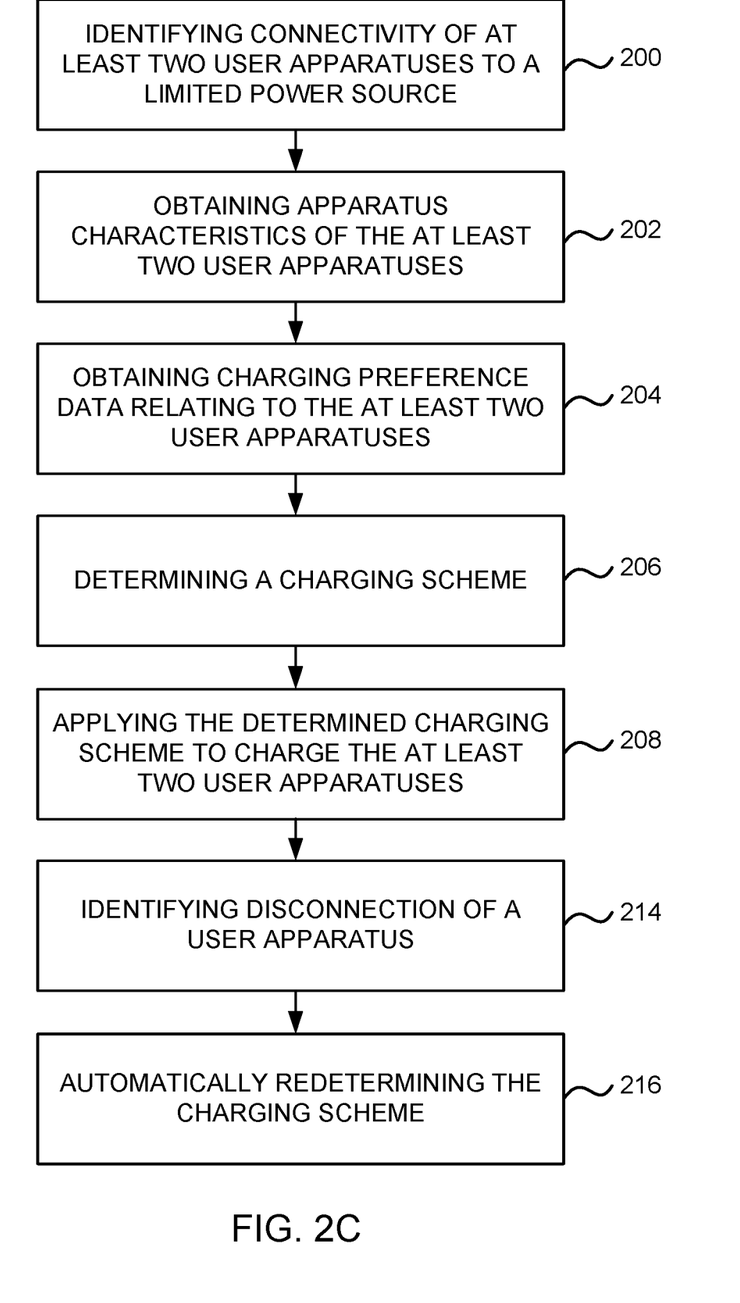
FIG. 2C is a flow diagram illustrating a method for determining a charging scheme according to another embodiment.

FIG. 2C is a block diagram illustrating a method for determining a charging scheme according to another embodiment. The difference between the embodiments of FIG. 2C and FIG. 2A is that after applying the determined charging scheme at 208 at 214 the intelligent application identifies disconnection of at least one user apparatus. Similarly, other intelligent applications possibly executed in other connected apparatuses may also notice the disconnection of the user apparatus. In response to the identification, at 216 the charging scheme is automatically redetermined. As an example, when the smart phone 302 has been disconnected, the power source 300 then continues to charge the tablet computer 302 and the battery pack 306 depending on the redetermined charging scheme.

In one embodiment of any of FIGS. 2A, 2B and 2C, information included in a calendar application may be utilized when determining the charging scheme. The calendar application may be a locally executed application in one of the user apparatuses. Alternatively, the calendar application may be accessible via a network connection, for example, in a cloud service.

When the charging scheme is to be determined, an intelligent application executed in an apparatus or by a network server may access the calendar application and the charging scheme may be determined taking into account information in the calendar application. For example, the calendar application may indicate that the user has an important appointment early next morning. The intelligent application may then determine that a smart phone of the user needs to be fully charged before the appointment. Therefore, the smart phone is charged first and the remaining time may be used to charge the remaining connected apparatus, for example, based on their relative priorities.

In one embodiment of any of FIGS. 2A, 2B and 2C, information included in the calendar application may indicate that the user has to make a conference call with a conference application installed in a laptop of the user. This piece of information may be utilized when determining the charging scheme. In this case, the charging scheme would first charge the laptop and only after the laptop has been fully charged, the user's smart phone and battery pack are charged.

In another embodiment of any of FIGS. 2A, 2B and 2C, the charging preference data may comprise natural language input from the user. The natural language input may be received from the user in a written or spoken form. As an example, the user may provide natural language input for the intelligent application. For example, the user may state that "I have three hours of free time, charge my phone first and then my tablet". Thus, the user may specifically set a desired charging sequence of his devices. When enabling the use of natural language input from the user, there is no need for the user to otherwise set any charging priorities. The intelligent application or applications automatically execute(s) a charging scheme based on the natural language input from the user.

In one embodiment of any of FIGS. 2A, 2B and 2C, information included in some other application, other than the calendar application, may be utilized when determining the charging scheme. For example, the intelligent application may notice that there is a train ticket in an email of the user's email application and that the user is heading to an important meeting where he needs to use his laptop computer. The train ticket may indicate that the user arrives at his destination within three hours. When the user connects multiple devices (for example, a laptop computer, a smart phone and a tablet computer) to his charger that is in turn connected to the electric power network of the train, the charging scheme may determine that the laptop is to be charged first.

When additional information included in one or more user-related applications is used in determining the charging scheme, the charging scheme may be automatically determined and executed without any user interaction.

Figure 4:
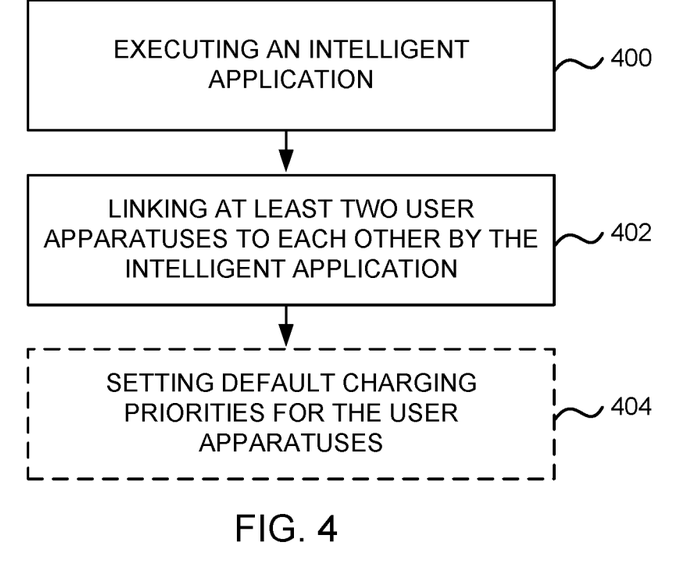
FIG. 4 is a flow diagram illustrating a setup phase of an intelligent application.

FIG. 4 is a flow diagram illustrating a setup phase of an intelligent application. At 400 the intelligent application is executed. The intelligent application may be executable by a user apparatus, for example, a smart phone, a tablet computer or a laptop computer. In another embodiment, the intelligent application is executed by a network server having a data connection to the user apparatus.

At 402 at least two user apparatuses are linked to each other by the intelligent application. The user apparatuses may originate from a single device manufacturer. Alternatively, user apparatuses may originate from at least two different device manufacturers. When the user apparatus are later connected to a limited power source, the previously established link enables to identify that the user apparatuses a linked to a single user.

At 404, optionally, default charging priorities may be set for the user apparatuses. If no other charging priority indication is available, the default charging priorities can be used when the at least two user apparatuses are connected to the limited power source via a USB-C connection.

As already discussed above in relation to the various embodiment, charging preference data relating to the user apparatuses may be obtained in many ways. For example, the user may provide natural language input based on which a charging scheme may be determined. In another embodiment, user-related data from at least one other application, for example, an email application or a calendar application, may be used when determining the charging scheme.

According to an aspect, there is provided a method comprising identifying, by at least one processor, connectivity of at least two user apparatuses to a power source via a USB-C connection, obtaining, by the at least one processor, apparatus characteristics of the at least two user apparatuses, obtaining, by the at least one processor, charging preference data relating to the at least two user apparatuses, determining, by the at least one processor, a charging scheme based on the apparatus characteristics and the charging preference data to provide charging power to the at least two user apparatuses from the power source, and applying, by the at least one processor, the determined charging scheme to charge the at least two user apparatuses via the USB-C connection.

In one embodiment, the apparatus characteristics comprise an apparatus type and battery status of a user apparatus.

In one embodiment, alternatively or in addition, the method further comprises accessing, by the at least one processor, a calendar application of a user, and determining the charging scheme taking into account information in the calendar application.

In one embodiment, alternatively or in addition, the method further comprises identifying, by the at least one processor, a calendar entry relating to the user, the calendar entry indicating a future use of at least one of the at least two user apparatuses, and determining, by the at least one processor, the charging scheme taking into account the calendar entry.

In one embodiment, alternatively or in addition, the method further comprises, by the at least one processor, receiving charging preference data from a user.

In one embodiment, alternatively or in addition, the charging preference data comprises natural language input from the user.

In one embodiment, alternatively or in addition, the method further comprises identifying, by the at least one processor, disconnection of the power source, and automatically redetermining the charging scheme.

In one embodiment, alternatively or in addition, the method further comprises identifying, by the at least one processor, disconnection of at least one user apparatus of the at least two user apparatuses, and automatically redetermining, by the at least one processor, the charging scheme.

In one embodiment, alternatively or in addition, the power source is a time-wise unpredictable power source.

In one embodiment, alternatively or in addition, the at least two user apparatuses comprise at least two of a smart phone, a tablet computer, a laptop computer and a battery pack.

In one embodiment, alternatively or in addition, communication between the at least two user apparatuses is provided via the USB-C connection.

In one embodiment, alternatively or in addition, communication between the at least two user apparatuses is provided via a wireless connection.

According to another aspect, there is provided an apparatus comprising at least one processing unit and at least one memory. The at least one memory stores program instructions that, when executed by the at least one processing unit, cause the apparatus to identify connectivity of at least two user apparatuses to a power source via a USB-C connection, obtain apparatus characteristics of the at least two user apparatuses, obtain charging preference data relating to the at least two user apparatuses, wherein the charging preference data comprises natural language input from a user, determine a charging scheme based on the apparatus characteristics and the charging preference data to provide charging power to the at least two user apparatuses from the power source, and apply the determined charging scheme to charge the at least two user apparatuses via the USB-C connection.

In one embodiment, the apparatus characteristics comprise an apparatus type and battery status of a user apparatus.

In one embodiment, alternatively or in addition, the at least one memory stores program instructions that, when executed by the at least one processing unit, cause the apparatus to access a calendar application of a user, and determine the charging scheme taking into account information in the calendar application.

In one embodiment, alternatively or in addition, the at least one memory stores program instructions that, when executed by the at least one processing unit, cause the apparatus to identify a calendar entry relating to a user, the calendar entry indicating a future use of at least one user apparatus, and determine the charging scheme taking into account the calendar entry.

In one embodiment, alternatively or in addition, the at least one memory stores program instructions that, when executed by the at least one processing unit, cause the apparatus to identify disconnection of the power source, and automatically redetermine the charging scheme.

In one embodiment, alternatively or in addition, the at least one memory stores program instructions that, when executed by the at least one processing unit, cause the apparatus to identify disconnection of at least one user apparatus, and automatically redetermine the charging scheme.

In one embodiment, alternatively or in addition, the user apparatuses comprise at least two of a smart phone, a tablet computer, a laptop computer and a battery pack.

According to another aspect, there is provided an apparatus comprising at least one processing unit and at least one memory. The at least one memory stores program instructions that, when executed by the at least one processing unit, cause the apparatus to identify connectivity of at least two user apparatuses to a power source via a USB-C connection, obtain apparatus characteristics of the at least two apparatuses, obtain charging preference data relating to the at least two user apparatuses, wherein the charging preference data comprises user-related data from at least one user application, determine a charging scheme based on the apparatus characteristics and the charging preference data to provide charging power to the at least two user apparatuses from the power source, and apply the determined charging scheme to charge the at least two user apparatuses via the USB-C connection.

According to another aspect, there is provided a user apparatus comprising means for identifying connectivity of at least two user apparatuses to a power source via a USB-C connection, means for obtaining apparatus characteristics of the at least two user apparatuses, means for obtaining charging preference data relating to the at least two user apparatuses, means for determining a charging scheme based on the apparatus characteristics and the charging preference data to provide charging power to the at least two user apparatuses from the power source, and means for applying the determined charging scheme to charge the at least two user apparatuses via the USB-C connection.

According to another aspect, there is provided a computer program comprising program code, which when executed by at least one processor, causes an apparatus to identify connectivity of at least two user apparatuses to a power source via a USB-C connection, obtain apparatus characteristics of the at least two user apparatuses, obtain charging preference data relating to the at least two user apparatuses, determine a charging scheme based on the apparatus characteristics and the charging preference data to provide charging power to the at least two user apparatuses from the power source, and apply the determined charging scheme to charge the at least two user apparatuses via the USB-C connection.

In one embodiment, the computer program is embodied on a computer-readable medium.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

The functions described herein performed by a controller may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. The software can be suitable for execution on a parallel processor or a serial processor such that the method steps may be carried out in any suitable order, or simultaneously.

Although the subject matter may have been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages.

Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. A method comprising:
   identifying, by at least one processor, connectivity of at least two user apparatuses to a power source via a connection;
   obtaining, by at least one application executing on the at least one processor, apparatus characteristics of the at least two user apparatuses;
   obtaining, by the at least one application executing on the at least one processor, charging preference data relating to the at least two user apparatuses;
   determining, by the at least one application executing on the at least one processor, a charging scheme based on the apparatus characteristics and the charging preference data to provide charging power to the at least two user apparatuses from the power source, wherein the charging scheme further allows any of the at least two user apparatuses to charge each other via the connection and allows the two user apparatuses to share power from the power source via the connection; and
   applying, by the at least one application executing on the at least one processor, the determined charging scheme to charge the at least two user apparatuses via the connection.

2. A method according to claim 1, wherein the apparatus characteristics comprise an apparatus type and battery status of a user apparatus.

3. A method according to claim 1, further comprising:
   accessing, by the at least one processor, a calendar application of a user; and
   determining, by the at least one processor, the charging scheme taking into account information in the calendar application.

4. A method according to claim 3, further comprising:
   identifying, by the at least one processor, a calendar entry relating to the user, the calendar entry indicating a future use of at least one of the at least two user apparatuses; and
   determining, by the at least one processor, the charging scheme taking into account the calendar entry.

5. A method according to claim 1, further comprising:
   receiving, by the at least one processor, charging preference data from a user.

6. A method according to claim 5, wherein the charging preference data comprises natural language input from the user.

7. A method according to claim 1, further comprising:
   identifying, by the at least one processor, disconnection of the power source; and
   automatically redetermining, by the at least one processor, the charging scheme.

8. A method according to claim 1, further comprising:
   identifying, by the at least one processor, disconnection of at least one user apparatus; and
   automatically redetermining, by the at least one processor, the charging scheme.

9. A method according to claim 1, wherein a first apparatus of the at least two apparatus comprises the at least one processor and the at least one application executing on the at least one processor.

10. A method according to claim 9, upon determining that the power source lacks the power to charge either of the at least two apparatus, determining, based on the charging scheme, which of the at least two apparatuses is to provide power to the other of the at least two apparatuses.

11. A method according to claim 1, wherein communication between the at least two user apparatuses is provided via the connection.

12. A method according to claim 1, wherein communication between the at least two user apparatuses is provided via a wireless connection.

13. A method according to claim 1, wherein the apparatus characteristics comprises one or more of the following: an apparatus type, apparatus owner information, apparatus manufacturer, maximum charging voltage/current, and charging status of the user apparatus.

14. An apparatus, comprising:
   at least one processing unit;
   at least one memory;
   wherein the at least one memory stores program instructions that, when executed by the at least one processing unit, cause the apparatus to:
   identify connectivity of at least two user apparatuses to a power source via a connection;
   obtain, by at least one application executing on the at least one processing unit, apparatus characteristics of the at least two user apparatuses;
   obtain, by the at least one application executing on the at least one processing unit, charging preference data relating to the at least two user apparatuses, wherein the charging preference data comprises natural language input from a user;
   determine, by the at least one application executing on the at least one processing unit, a charging scheme based on the apparatus characteristics and the charging preference data to provide charging power to the at least two user apparatuses from the power source, wherein the charging scheme further allows the at least two user apparatuses to charge each other via the connection and allows the two user apparatuses to share power from the power source via the connection; and
   apply, by the at least one application executing on the at least one processing unit, the determined charging scheme to charge the at least two user apparatuses via the connection.

15. An apparatus according to claim 14, wherein the apparatus characteristics comprises an apparatus type of battery status of a user apparatus.

16. An apparatus according to claim 14, wherein the at least one memory stores program instructions that, when executed by the at least one processing unit, cause the apparatus to:
   access a calendar application of a user; and
   determine the charging scheme taking into account information in the calendar application.

17. An apparatus according to claim 16, wherein the at least one memory stores program instructions that, when executed by the at least one processing unit, cause the apparatus to:
   identify a calendar entry relating to the user, the calendar entry indicating a future use of at least one of the at least two user apparatuses; and
   determine the charging scheme taking into account the calendar entry.

18. An apparatus according to claim 14, wherein the at least one memory stores program instructions that, when executed by the at least one processing unit, cause the apparatus to:
   identify disconnection of the power source; and
   automatically redetermine the charging scheme.

19. An apparatus according to claim 14, wherein the at least one memory stores program instructions that, when executed by the at least one processing unit, cause the apparatus to:
   identify disconnection of at least one user apparatus; and
   automatically redetermine the charging scheme.

20. An apparatus, comprising:
   at least one processing unit;
   at least one memory;
   wherein the at least one memory stores program instructions that, when executed by the at least one processing unit, cause the apparatus to:
   identify, by the at least one application executing on the at least one processing unit, connectivity of at least two user apparatuses to a power source via a Universal Serial connection;
   obtain, by at least one application executing on the at least one processing unit, apparatus characteristics of the at least two user apparatuses;
   obtain, by the at least one application executing on the at least one processing unit, charging preference data relating to the at least two user apparatuses, wherein the charging preference data comprises user-related data from at least one user application;
   determine, by the at least one application executing on the at least one processing unit, a charging scheme based on the apparatus characteristics and the charging preference data to provide charging power to the at least two user apparatuses from the power source, wherein the charging scheme further allows the at least two user apparatuses to charge each other via the connection and allows the two user apparatuses to share power from the power source via the connection; and
   apply, by the at least one application executing on the at least one processing unit, the determined charging scheme to charge the at least two user apparatuses via the connection.

* * * * *